US009216635B2

(12) United States Patent
Medina et al.

(10) Patent No.: US 9,216,635 B2
(45) Date of Patent: Dec. 22, 2015

(54) ENCAPSULATED WINDSHIELD MOLDING

(71) Applicants: Dimitri T. Medina, Plano, TX (US); Phillip J. Hall, Corinth, TX (US); David Leetz, Denton, TX (US); Edward Patrick Reeves, Denton, TX (US); Frank H. Schneck, Corinth, TX (US)

(72) Inventors: Dimitri T. Medina, Plano, TX (US); Phillip J. Hall, Corinth, TX (US); David Leetz, Denton, TX (US); Edward Patrick Reeves, Denton, TX (US); Frank H. Schneck, Corinth, TX (US)

(73) Assignee: PACCAR INC, Bellevue, WA (US)

( * ) Notice: Subject to any disclaimer, the term of this patent is extended or adjusted under 35 U.S.C. 154(b) by 0 days.

(21) Appl. No.: 13/801,265

(22) Filed: Mar. 13, 2013

(65) Prior Publication Data
US 2014/0265422 A1 Sep. 18, 2014

(51) Int. Cl.
*B60J 1/00* (2006.01)
*B60J 10/02* (2006.01)

(52) U.S. Cl.
CPC . *B60J 10/02* (2013.01); *B60J 1/004* (2013.01)

(58) Field of Classification Search
CPC .............. B60J 1/004; B60J 1/10; B60J 10/02; B60J 10/0088
USPC ............................ 296/201, 146.15, 93, 96.21
See application file for complete search history.

(56) References Cited

U.S. PATENT DOCUMENTS

| | | | | |
|---|---|---|---|---|
| 2,647,289 A | * | 8/1953 | Harbert | 296/93 |
| 2,736,404 A | * | 2/1956 | Clingman | 296/93 |
| 3,150,421 A | * | 9/1964 | Lickert | 296/93 |
| 4,322,105 A | * | 3/1982 | Onda | 296/93 |
| 4,688,752 A | | 8/1987 | Barteck | |
| 4,778,366 A | | 10/1988 | Weaver | |
| 4,905,432 A | | 3/1990 | Romie | |
| 4,929,490 A | * | 5/1990 | Iwasa | 296/93 |
| 5,083,835 A | | 1/1992 | Rossini | |
| 5,268,183 A | | 12/1993 | Garza | |
| 5,480,207 A | | 1/1996 | Gold | |
| 6,658,802 B2 | | 12/2003 | Lucas, Jr. | |
| 6,971,702 B2 | | 12/2005 | Boettger | |
| 7,703,830 B2 | | 4/2010 | Earl | |
| 2008/0191508 A1 | | 8/2008 | Kolokowski | |

FOREIGN PATENT DOCUMENTS

| | | | |
|---|---|---|---|
| DE | 4127717 A1 | * | 2/1993 |
| WO | 2012/011912 A1 | | 1/2012 |

OTHER PUBLICATIONS

Machine Translation of DE4127717A1, printed from the EPO website on Jan. 31, 2015.*
"Encapsulated Glass," Product Information, Apr. 27, 2008, Cooper Standard, Novi, Michigan, <http://www.cooperstandard.com/encapsulated_glass.php> [retrieved May 17, 2012], 1 page.

* cited by examiner

*Primary Examiner* — Jason S Morrow
(74) *Attorney, Agent, or Firm* — Christensen O'Connor Johnson Kindness PLLC

(57) ABSTRACT

An encapsulated windshield molding surrounds at least a portion of the peripheral edge of the windshield and includes one or more seals, such as multiple lip or whisker-type seals. The encapsulated molding aims to provide a water-tight installation of the windshield into the windshield opening of the vehicle and allows for butyl-free or adhesive-free restraint of the windshield.

16 Claims, 2 Drawing Sheets

ENCAPSULATED WINDSHIELD MOLDING

BACKGROUND

Recent changes to the outside appearance of cars and trucks have been greatly influenced by aerodynamic requirements. With respect to such aerodynamic requirements, significant changes have taken place in the manner of mounting of windshield glass to a vehicle body.

One major change has been from a gasket-type mounting of a windshield which yields a definite offset between the glass surface and the body surface, to a bonded glass mounting which provides a glass surface and body surface in nearly the same plane. In such bonded mounting, a small extruded vinyl trim strip is positioned within a channel between the glass and body panels and extends over the glass and body panels after the glass is adhesively bonded in place, to provide a finished appearance to the juncture. The adhesive layer used to retain the glass in place is also used to retain the trim strip in place.

Further, more recent advancements have introduced an encapsulated glass process. This process includes the molding of a plastic trim strip onto the periphery of the glass, using an injection molding process in which the glass is placed into the mold during the molding process. This method provides a single unit for installation with excellent dimensional tolerances along the perimeter of the assembly. However, butyl or other adhesives, such as polyurethane, are still used to retain the encapsulated glass within the windshield mask.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with aspects of the present disclosure, a windshield assembly is provided. The assembly includes a windshield having a outer perimeter and an encapsulated body extending around the perimeter of the windshield and mounted thereto. The body in some embodiments includes an open-ended channel configured for receiving the windshield mask in a mechanically locking manner, and a windshield mask interface having primary and secondary lip seals that extend outwardly in a direction opposite the windshield.

In accordance with another aspect of the present disclosure, a windshield assembly is provided. The assembly includes a windshield having a outer perimeter and an encapsulated body extending around the perimeter of the windshield and mounted thereto. The encapsulated body in some embodiments includes an open-ended channel configured for receiving the windshield mask in a mechanically locking manner. The assembly also includes means for sealing against a vehicle fame that is butyl or adhesive independent. In some embodiments, the means for sealing includes one or more seals, such as whisker seals.

In accordance with yet another aspect of the present disclosure, a vehicle is provided. The vehicle comprises a windshield having a outer perimeter and an encapsulated body extending around the perimeter of the windshield and mounted thereto. The body in some embodiments comprises an open-ended channel and a vehicle body interface having primary and secondary lip seals that extend outwardly in a direction opposite the windshield. The vehicle also includes a vehicle body having structure defining a windshield opening. The structure in some embodiments include a stepped free end. The windshield is mounted in the windshield opening such that a portion of the stepped free end is received by the open-ended channel and mechanically locked thereto. In some embodiments, at least one of the primary and secondary lip seals contact a portion of the stepped free end.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result.

Generally described, examples of the present disclosure are directed to an encapsulated windshield molding for a vehicle, such as medium and heavy duty trucks. Some embodiments provided herein may improve the aerodynamics of the associated vehicle, improve windshield installation time, etc. According to aspects of the present disclosure, the encapsulated windshield molding surrounds at least a portion of the peripheral edge of the windshield and includes multiple lip or whisker-type seals. The example configurations of the encapsulated molding aim to provide a water-tight installation of the windshield into the windshield opening of the vehicle and allows for butyl-free or adhesive-free restraint of the windshield.

Although embodiments of the present disclosure will be described with reference to a windshield for a heavy truck, one skilled in the relevant art will appreciate that the disclosed embodiments are illustrative in nature, and therefore, should not be construed as limited to applications with a heavy truck. It should therefore be apparent that the examples of the present disclosure have wide application, and may be used in any situation where a windshield is mounted to a vehicle opening. It should be noted that for purposes of this disclosure, terminology such as "upper," "lower," "vertical," "horizontal," "fore," "aft," "inner," "outer," "front," "rear," etc., should be construed as descriptive and not limiting.

In the following description, numerous specific details are set forth in order to provide a thorough understanding of exemplary embodiments of the present disclosure.

It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Figure 1:
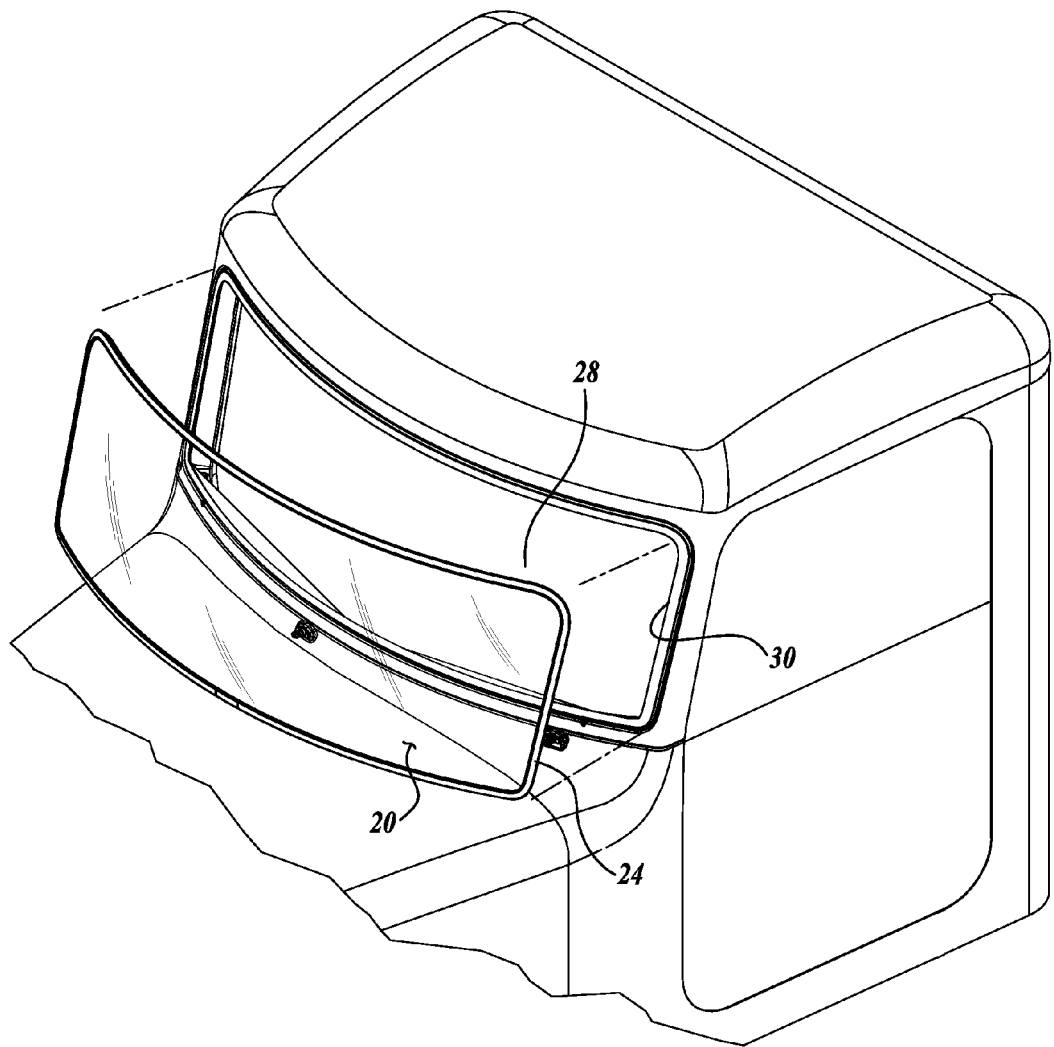
FIG. 1 is an exploded view of a windshield having an encapsulated windshield molding in accordance with aspects of the present disclosure.

Referring now to FIG. 1, one example of a windshield 20 having an encapsulated windshield molding, generally designated 24, for mounting the windshield 20 into a windshield opening 28 defined by vehicle structure 30. The vehicle structure 30 is generally referred to as the windshield mask. As shown in cross section in FIG. 2, the free end of the windshield mask 30 is generally stepped, thereby forming a generally curving outer portion 40, interiorly spaced inner portion 44, and a middle portion 48 generally transverse to and interconnecting the inner portion 48 and the outer portion 44. Although the following description will be directed to the encapsulated windshield molding 24 at a location about the side of the windshield 20 and the corresponding location of the opening 28 of the vehicle structure 30, the molding 24 may extend around the entire periphery of the windshield 20. The molding 24 may have a constant cross section in some embodiments while in others it may be that the cross-sectional shape of the molding 24 may vary according to where it is located on the periphery of the windshield 20, and the shape of the vehicle structure 30.

Figure 2:
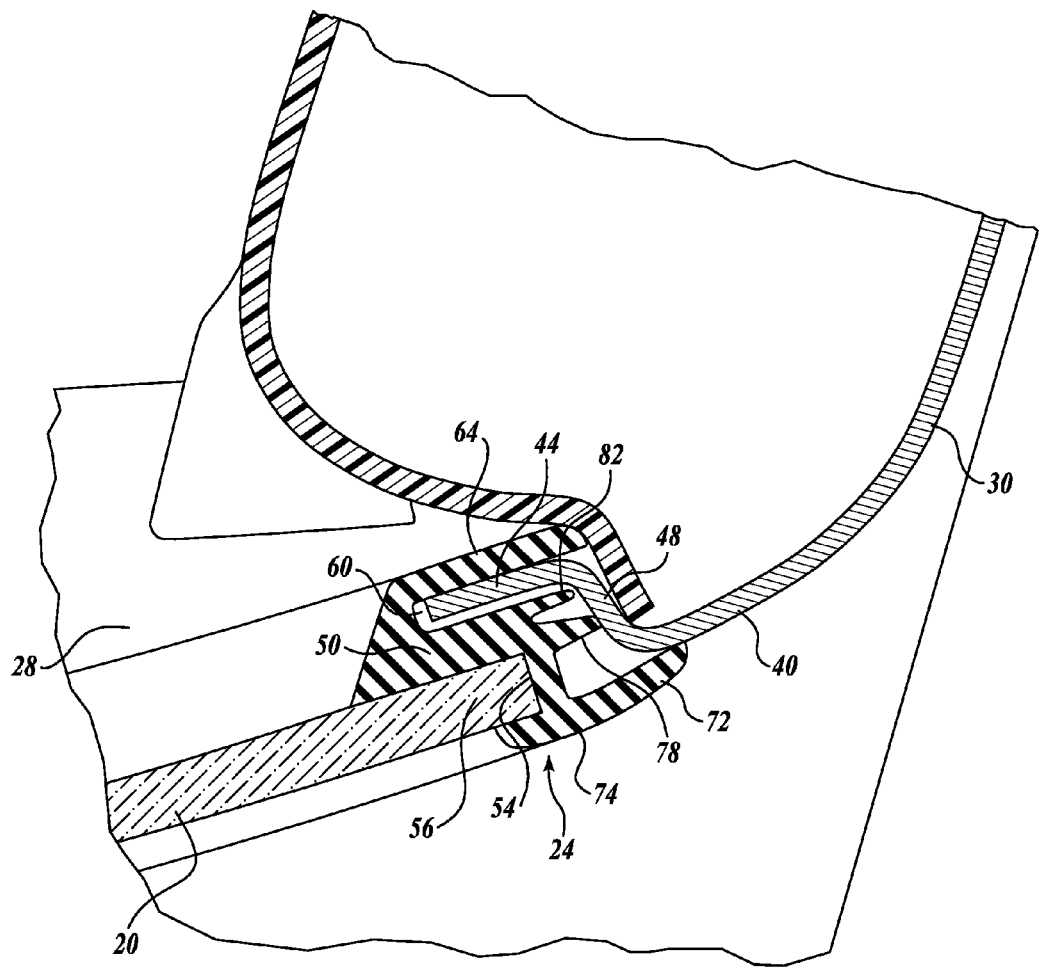
FIG. 2 is a cross section view of a windshield mounted in a windshield opening of a vehicle, the windshield having an example of an encapsulated windshield molding disposed therearound.

Still referring to FIG. 2, the encapsulated windshield molding 24 includes a body 50 that may be formed of rubber or an injection molded plastic, although other resilient or elastomeric materials and methods of forming the body are possible. It is possible that the body 50 can have various co-extruded shapes, or can be formed of one or more materials, types of materials, etc. In the embodiment shown, the body 50 on one side defines a windshield receiving portion 54, such as a generally rectangular-shaped channel. The windshield receiving portion 54 is generally configured to receive and at least partially encapsulate a peripheral edge 56 of the windshield 20. The body 50 also includes a windshield mask opening 60, which is positioned on the side of the body 50 opposite the windshield receiving portion 54 and spaced interiorly therefrom. The windshield mask opening 60, which is shown as a generally rectangular shaped channel, is configured to receive the inner portion 44 of the windshield mask 30. As shown in the embodiment of FIG. 2, the outwardly extending lip or flange 64 that forms the interior wall of the windshield mask opening 60 extends a majority of the body 50 and generally parallel to the outer edge of the windshield 20. As will be described in more detail below, the windshield mask opening 60 is configured to interface with the windshield mask 30 in order to retain the encapsulated window in the window opening 28.

A roped-in method may be employed when installing the windshield in order to move the flange 64 formed by the windshield mask opening 60 into mask retaining position (e.g., against the interior face of the windshield mask inner portion 44 shown in FIG. 2). In one embodiment, the windshield mask opening 60 extends into a majority of the body 50. Once the mask 30 is disposed in the windshield mask opening 60, the windshield 20 is mechanically retained in the windshield opening 28 without the need of additionally retaining means, such as butyl tape, urethane adhesives, etc.

In accordance with other aspects of the present disclosure, the body 50 further includes one or more mechanical-type seals in order to prevent water ingress. In that regard, the body 50 in some embodiments includes a primary seal 72. In the embodiment shown, the primary seal 72 extends in the general direction of the windshield mask opening 60 but spaced outwardly therefrom. The primary seal 72 includes a generally curved outer surface 74 to provide a smooth and aerodynamic transition from the windshield 20 to the vehicle A-pillar or other vehicle structure, etc. In some embodiments, the body 50 also includes a secondary seal 78 spaced interiorly from the primary seal 72, and an optional tertiary seal 82 spaced interiorly from the secondary seal 78. In the embodiment shown, the seals 72, 78, and 82 are of the lip or whisker type, although other seal configurations may be practiced with embodiments of the present disclosure. In some embodiments, the secondary and/or tertiary seals can be configured and arranged to flex slightly away from the mask 30 when the windshield is installed, in order to provide some tension or bias against the mask 30, thereby improving the sealing interface between the two. In the embodiment shown, the secondary and/or tertiary seals may engage against the interconnecting middle portion 48 of the mask 30.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A windshield assembly for use with a windshield mask having an inner portion with a free end, a middle portion, and an outer portion, the assembly comprising:
   a windshield having an outer perimeter;
   a molding comprising a windshield receiving portion, a windshield mask opening, and a body positioned between the windshield receiving portion and the windshield mask opening, the windshield receiving portion extending around the outer perimeter of the windshield and mounted thereto, the windshield mask opening configured for receiving the free end of the windshield mask in a mechanically locking manner,
   wherein the molding has a primary lip seal extending from an outer portion of the windshield receiving portion,
   wherein the molding has a secondary lip seal and a tertiary lip seal, both of which extend outwardly from the body of the molding between the windshield receiving portion and the windshield mask opening in a direction opposite the windshield, the secondary lip seal extending further from the body of the molding than the tertiary lip seal, and the tertiary lip seal configured such that the tertiary lip seal does not engage the windshield mask after the molding is installed on the windshield mask, and
   wherein the primary lip seal is configured to contact the outer portion of the windshield mask, the secondary lip seal is configured to contact the middle portion of the windshield mask, and the tertiary lip seal is configured to extend toward the middle portion of the windshield mask when the free end of the windshield mask is received into the windshield mask opening.

2. The windshield assembly of claim 1, wherein the tertiary seal defines at least in part the windshield mask opening.

3. The windshield assembly of claim 1, wherein the molding retains the windshield with respect to the windshield mask without butyl.

4. The windshield assembly of claim 1, wherein the molding couples the windshield to the windshield mask without adhesive.

5. The windshield assembly of claim 1, wherein the windshield includes a single, curved piece of substrate.

6. The windshield assembly of claim 5, wherein the substrate includes glass.

7. A windshield assembly for use with a windshield mask having an inner portion with a free end, a middle portion, and an outer portion, the assembly comprising:
a windshield having an outer perimeter;
a molding comprising a windshield receiving portion, a windshield mask opening, and a body positioned between the windshield receiving portion and the windshield mask opening, the windshield receiving portion extending around the perimeter of the windshield and mounted thereto, the windshield mask opening configured for receiving the free end of the windshield mask in a mechanically locking manner; and
means for sealing against a vehicle frame that is butyl or adhesive independent, wherein said means for sealing comprises:
a primary lip seal extending from an outer portion of the windshield receiving portion, wherein the primary lip seal is configured to contact the outer portion of the windshield mask when the free end of the windshield mask is received into the windshield mask opening,
a secondary lip seal extending outwardly from the body of the molding between the windshield receiving portion and the windshield mask opening in a direction opposite the windshield, wherein the secondary lip seal is configured to contact the middle portion of the windshield mask when the free end of the windshield mask is received into the windshield mask opening, and
a tertiary lip seal extending outwardly from the body of the molding between the windshield receiving portion and the windshield mask opening in a direction opposite the windshield, wherein the secondary lip seal extends further from the body of the molding than the tertiary lip seal, wherein the tertiary lip seal is configured to extend toward the middle portion of the windshield mask when the free end of the windshield mask is received into the windshield mask opening, and wherein the tertiary lip seal is configured such that the tertiary lip seal does not engage the windshield mask after the molding is installed on the windshield mask.

8. The windshield assembly of claim 7, wherein the tertiary seal defines at least in part the windshield mask opening.

9. The windshield assembly of claim 7, wherein the windshield includes a single, curved piece of substrate.

10. The windshield assembly of claim 9, wherein the substrate includes glass.

11. A vehicle, comprising:
a windshield having an outer perimeter;
a molding comprising a windshield receiving portion, a windshield mask opening, and a body positioned between the windshield receiving portion and the windshield mask opening, the windshield receiving portion extending around the outer perimeter of the windshield and mounted thereto, the molding further comprising a primary lip seal extending from an outer portion of the windshield receiving portion and a secondary lip seal and a tertiary lip seal, both of which extend outwardly from the body of the molding between the windshield receiving portion and the windshield mask opening in a direction opposite the windshield, the secondary lip seal extending further from the body of the molding than the tertiary lip seal; and
a vehicle body having structure defining a windshield opening, the structure having an inner portion that defines a free end, a middle portion, and an outer portion, wherein the windshield is mounted in the windshield opening such that a portion of the free end is received by the windshield mask opening and mechanically locked thereto,
wherein the primary lip seal contacts the outer portion of the structure, the secondary lip seal contacts the middle portion of the structure, the tertiary lip seal extends toward the middle portion of the structure, and the tertiary lip seal is configured such that the tertiary lip seal does not engage the structure after the molding is installed on the windshield opening.

12. The vehicle of claim 11, wherein the windshield includes a single, curved piece of substrate.

13. The windshield assembly of claim 11, wherein the tertiary seal defines at least in part the windshield mask opening.

14. The windshield assembly of claim 11, wherein the molding couples the windshield to the windshield mask without adhesive or butyl.

15. The windshield assembly of claim 11, wherein the primary and secondary lip seals do not form any part of the windshield mask opening.

16. The windshield assembly of claim 1, wherein the primary and secondary lip seals do not form any part of the windshield mask opening.

\* \* \* \* \*